UNITED STATES PATENT OFFICE 2,415,627

MIXED DISULFIDES AND PROCESS FOR PREPARING THE SAME

Robert H. Cooper, Nitro, W. Va., assignor to Monsanto Chemical Company, St. Louis, Mo., a corporation of Delaware No Drawing. Application August 17, 1945, Serial No. 611,265

8 Claims. (Cl. 260—306.5)

The present invention relates to mixed disulfides of mercaptothiazoles and xanthates.

It is well known that symmetrical disulfides are obtained from mercaptothiazoles by oxidation under suitable conditions. Similarly alkali metal xanthates are readily oxidized to the corresponding disulfides. In either case the resulting product is a symmetrical compound composed of two molecules of the mercaptothiazole or xanthate.

In accordance with this invention it has been found that one molecule of a mercapto thiazole can be combined with one molecule of a xanthate to form mixed or unsymmetrical disulfides. Exemplary of the new class of products are compounds possessing the structure

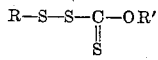

where R represents a thiazyl group and R' represents an aliphatic group. Typical examples of R comprise 4-methyl thiazyl-, naphtho thiazyl-, 4-phenyl benzo thiazyl-, 4-ethyl thiazyl-, benzo thiazyl-, dihydro thiazyl-, 2-chlor benzo thiazyl-, 6-phenyl benzo thiazyl-, 4-methyl benzo thiazyl- and nitro benzo thiazyl- groups. Typical examples of R' comprise amyl, allyl, methyl, ethyl, propyl, butyl, hexyl, octyl, lauryl, cyclohexyl, benzyl and methoxy ethyl groups.

The new mixed disulfides are valuable vulcanizing agents and accelerators for rubber whether natural or synthetic. The products are also useful for increasing the load carrying capacity of mineral oils, for ore flotation, for insecticides and other uses.

The new products may be prepared most conveniently by converting a mercapto thiazole to a thiazyl sulfur chloride and reacting the latter with an alkali metal xanthate. The salt formed as a by-product is then removed. The residue comprising the crude mixed disulfide may be used as such or further purified as desired.

The following are specific embodiments of the invention illustrative of the invention but are not to be taken as limitative thereof.

EXAMPLE 1

Substantially 66 parts by weight of dithio bis benzothiazole (substantially 0.2 molecular proportions) was suspended in substantially 790 parts by weight of dry carbon tetrachloride. Chlorine gas was passed into the atmosphere above the surface of the suspension until approximately 26 parts by weight had been absorbed. The charge was then slowly heated to 70° C. to drive off the excess of chlorine after which it was cooled. The benzothiazyl sulfur chloride so prepared was added to a suspension of 89 parts by weight of 89% potassium ethyl xanthate (substantially 0.5 molecular proportions) in 320 parts by weight of dry carbon tetrachloride while keeping the temperature at 8–25° C. Stirring was continued for about three hours after the addition of the xanthate while the temperature was gradually raised from 15° to 35° and the salt then filtered off. The solvent was removed by evaporation and the residue dissolved in ether and filtered again to separate a small amount of insolubles. The solvent was again evaporated leaving a heavy oil which was extracted with petroleum ether. The residue from the petroleum ether extraction was freed from traces of solvent leaving the desired ethyl thiocarbonyl, benzothiazyl disulfide of the structure

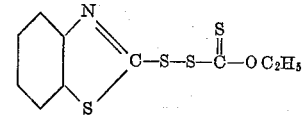

| Analysis | Found | Calculated |
|---|---|---|
| | Per cent | Per cent |
| Sulfur | 45.3 | 44.6 |
| Nitrogen | 4.1 | 4.8 |

EXAMPLE 2

Chlorine was passed into the atmosphere above the surface of a suspension of substantially 48.4 parts by weight (substantially 0.1 molecular proportion) of dithio bis 4-phenyl benzothiazole in substantially 480 parts by weight of dry carbon tetrachloride. The chlorine was absorbed at room temperature (about 25° C.) and after about 7 parts by weight had been absorbed the charge was slowly heated to 70° to drive off any excess chlorine.

The solution of 4-phenyl benzothiazyl sulfur chloride so prepared was slowly added to a suspension of 36 parts by weight (substantially 0.2 molecular proportions) of potassium ethyl xanthate (89% purity) in 320 parts by weight of dry carbon tetrachloride. The addition was carried out at 20–30° C. and the charge then stirred at 30–40° C. for about 4 hours. The salt formed as a by-product was filtered off and the solvent removed from the filtrate by evaporation. The residue consisting of a reddish brown oil was dissolved in ether, filtered and the ether removed. The residue was then extracted with petroleum ether. The solid residue from the petroleum ether extraction after one recrystallization from ether melted at 82-85°. The product was believed to be ethyl thiocarbonyl, 4-phenyl benzothiazyl disulfide.

| Analysis | Found | Calculated |
|---|---|---|
| | Per cent | Per cent |
| Sulfur | 34.6 | 35.2 |
| Nitrogen | 4.3 | 3.8 |

EXAMPLE 3

Chlorine was passed into the atmosphere above the surface of a suspension of 33 parts by weight (substantially 0.1 molecular proportion) of dithio bis benzothiazole in 320 parts by weight of dry carbon tetrachloride at about 25° C. After 10.0 parts by weight had been absorbed the temperature was raised slowly to 70° C. to remove any excess chlorine.

The solution of benzothiazyl sulfur chloride so prepared was slowly added to a suspension of substantially 66 parts by weight of 90% potassium amyl xanthate (substantially 0.2 molecular proportions) in 320 parts by weight of dry carbon tetrachloride while keeping the temperature at 20-30° C. The charge was stirred for 5 hours at 30-35° C., then cooled and the salt filtered off. The solvent was removed from the filtrate by evaporation and the residue dissolved in ether and kept cold until there was no further separation of solids. The solid matter was filtered off and the solvent removed from the filtrate leaving a reddish oil entirely soluble in petroleum ether. This product was believed to be amyloxy thiocarbonyl, benzothiazyl disulfide of the structure

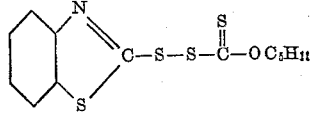

The compounds to which this invention relates are valuable vulcanizing agents for synthetics and provide cured products which retain their properties better on aging than ordinary sulfur vulcanizates. They may be used in substantially any of the standard formulae, one found particularly satisfactory being the following:

| | Parts by weight |
|---|---|
| GR-S rubber [1] | 100 |
| Carbon black | 40 |
| Zinc oxide | 3 |
| Hydrocarbon softener | 8 |
| Dithio bis benzothiazole | 2 |
| Ethyl thiocarbonyl, benzothiazyl disulfide | 4 |

[1] Copolymer of butadiene-1,3 and styrene.

The stock so compounded was cured by heating in a press for 90 minutes at 142° C. and the cured product artificially aged by heating in an oven for 24 hours in circulating air at 100° C. The physical properties of the cured product before and after aging are set forth below:

Table

| | Modulus of elasticity in lbs./in.$^2$ at 300% elongation | Tensile strength, lbs./in.$^2$ | Ultimate elongation, per cent |
|---|---|---|---|
| Unaged | 505 | 2,500 | 700 |
| Aged | 545 | 2,485 | 690 |

The examples and description set forth above are intended to be illustrative only. Many modifications and changes may be made in the specific examples set forth to illustrate the invention without departing from the scope or spirit of the invention. The invention is limited solely by the claims attached hereto as part of the present specification.

What is claimed is:

1. A mixed disulfide of the structure

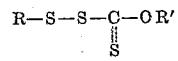

where R is a thiazyl group and R' is an alkyl group.

2. A mixed disulfide of the structure

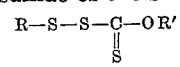

where R is an arylene thiazyl group and R' is an alkyl group.

3. A mixed disulfide of the structure

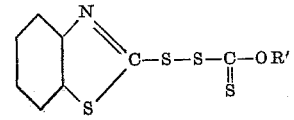

where R' is a short chain alkyl group.

4. A mixed disulfide of the structure

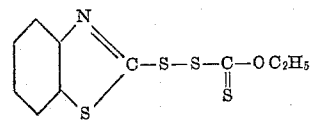

5. The method of making a mixed disulfide which comprises reacting a thiazyl sulfur chloride with an alkali metal xanthate.

6. The method of making a mixed disulfide which comprises reacting an arylene thiazyl sulfur chloride with an alkali metal xanthate.

7. The method of making a mixed disulfide which comprises reacting benzothiazyl sulfur chloride with an alkali metal xanthate.

8. The method of making a mixed disulfide which comprises reacting benzothiazyl sulfur chloride with potassium ethyl xanthate.

ROBERT H. COOPER.